United States Patent
Andersen

(10) Patent No.: US 7,929,807 B2
(45) Date of Patent: Apr. 19, 2011

(54) COLOUR BINNING OF A DIGITAL IMAGE TO REDUCE THE IMAGE RESOLUTION

(75) Inventor: Thomas Andersen, Køge (DK)

(73) Assignee: Phase One A/S, Frederiksberg (DK)

( * ) Notice: Subject to any disclaimer, the term of this patent is extended or adjusted under 35 U.S.C. 154(b) by 1087 days.

(21) Appl. No.: 11/711,361

(22) Filed: Feb. 27, 2007

(65) Prior Publication Data

US 2008/0205792 A1    Aug. 28, 2008

(51) Int. Cl.
*G06K 9/32*    (2006.01)

(52) U.S. Cl. ......... 382/299; 382/163; 382/167; 345/698

(58) Field of Classification Search ............ 382/162, 382/163, 167, 299; 345/698
See application file for complete search history.

(56) References Cited

U.S. PATENT DOCUMENTS

| | | | |
|---|---|---|---|
| 6,714,242 B1 | 3/2004 | Kobayashi | |
| 6,724,932 B1 | 4/2004 | Ito | |
| 6,794,627 B2 * | 9/2004 | Lyon et al. | 250/208.1 |
| 7,479,994 B2 * | 1/2009 | Yang et al. | 348/241 |
| 7,646,910 B1 * | 1/2010 | Linzer | 382/166 |
| 2003/0223649 A1 | 12/2003 | Findlater et al. | |
| 2005/0002589 A1 | 1/2005 | Walmsley | |
| 2006/0109352 A1 * | 5/2006 | Draijer | 348/230.1 |
| 2006/0119738 A1 | 6/2006 | Kido | |
| 2006/0203113 A1 | 9/2006 | Wada et al. | |

* cited by examiner

*Primary Examiner* — Vikkram Bali
*Assistant Examiner* — Eueng-Nan Yeh
(74) *Attorney, Agent, or Firm* — Knobbe Martens Olson & Bear LLP

(57) ABSTRACT

The invention relates to a method for reducing the pixel resolution of a digital image by binning pixels together to form macro pixels. The digital image comprises pixels arranged in a color mask of at least three different colors. The color mask can be a Bayer mask comprising one red pixel, two green pixels and one blue pixel. The pixel binning method comprises selecting a number of pixels of each color. For example, in order to obtain a factor two resolution reduction, four red pixels can be binned for generating a red macro pixel and eight green pixels can be binned for generating two green macro pixels. By selecting for example only one blue pixel and using that pixel for generating a blue macro pixel the optical centers of the macro pixels will be evenly distributed over the image.

18 Claims, 14 Drawing Sheets

COLOUR BINNING OF A DIGITAL IMAGE TO REDUCE THE IMAGE RESOLUTION

FIELD OF THE INVENTION

The invention relates to image processing and in particular colour binning of colour pixels of a digital image.

BACKGROUND OF THE INVENTION

The technology of CCD image sensors constantly improves leading to increasing image sensor resolutions. Today, high performance cameras are equipped with 10-20 Mega pixel resolution sensors or even higher resolutions. Low performance cameras in mobile phones use 3 mega pixel sensors or even higher resolutions. Future high and low performance cameras will most likely follow the trend of using image sensors with even higher pixel resolutions.

The increasing pixel resolution provides increasing amounts of image data to be processed and transferred from one device to another, for example from the mobile phone to a computer or the Internet. Accordingly, data processors and electronic memory must meet higher speed and capacity requirements in order to handle the increasing amounts of image data.

Cameras may be used both for still picture recording and video recording. Video recording typically requires lower pixel resolution than the nominal sensor resolution in order meet requirements of readout speed and memory capacity for video images. Accordingly, the resolution of the image sensor needs to be downscaled for video recording.

Another problem related to the increasing pixel resolutions of image sensors is related to the sensor's sensitivity to light and the dynamic range of sensor. In order to increase the image sensor's sensitivity to light, for example under low light level conditions, the pixel resolution of the image sensor may beneficially be reduced by binning together a number of pixels. By binning together a number of pixels the light receiving area of one pixel increases and consequently, also the light sensitivity of the sensor increases.

The amount of image data generated by an image sensor can be reduced by reading out only a fraction of pixels from the image sensor, for example by reading out only every second or third pixel and skipping the rest. However such method results in poor image quality.

Accordingly it may be seen as a problem to reduce the amount of image data without reducing the image quality significantly.

US 2006/0203113 discloses a method for downsizing pixel information by pixel binning. An example describes that four (2×2) pixels are skipped and added and an amount of pixel information is compressed at a ratio of ¼. First, all pieces of pixel information of a same colour filter in first and third columns of a first row and the first and the third column of a third row, all pieces of pixel information of G in this example, are added and outputted as information for one pixel. Next, all pieces of pixel information of a same colour filter in second and fourth columns of the first row and the second and the fourth columns of the third row, all pieces of pixel information of B in this example, are added and outputted as information for one pixel. Then, all pieces of pixel information in fifth and seventh columns of the first row and the fifth and the seventh columns of the third row, all pieces of pixel information of G in this example, are added and outputted as information for one pixel. When the same operation is repeated and pixels to be read out reach a last column or a column near the last column, then all pieces of pixel information of a same colour filter in the first and the third columns of a second row and the first and the third columns of a fourth row, all pieces of pixel information of R in this example, are added and outputted as information for one pixel.

SUMMARY OF THE INVENTION

Accordingly, the invention preferably seeks to mitigate, alleviate or eliminate one or more of the above mentioned problems singly or in any combination. In particular, it may be seen as an object of the present invention to provide a method of reducing the resolution of a digital image by binning together pixels of the image so that optical centres of the binned pixels remains evenly distributed over the image.

This object and several other objects are obtained in a first aspect of the invention by providing a method for reducing a resolution of a digital colour image where the digital colour image comprises pixels arranged in a colour mask of at least three different colours, the pixels comprise first pixels, second pixels, third pixels and fourth pixels, the method comprising:

recording a digital colour image using the colour mask, selecting n×n first pixels outlining a first square, and using values of these selected n×n pixels for generating a value of a first macro pixel, selecting n×n second pixels outlining a second square being rotated 45 degrees and shifted horizontally relative to the first square, and using values of these selected n×n pixels for generating a value of a second macro pixel, selecting n×n third pixels outlining a third square being rotated 45 degrees and shifted vertically relative to the first square, and using values of the n×n pixels for generating a value of a third macro pixel, where each of the first, second and third macro pixels has an optical centre determined by the relative positions of the pixels used to generate the value of the macro pixel, wherein the pixels used to generate values of the first, second and third macro pixels are selected to position the optical centres of each of the first, second and third macro pixels at identical positions within each of the first, second and third macro pixels, so that these optical centres form a uniform grid, and selecting M pixels from n×n fourth pixels outlining a fourth square oriented identically to and shifted diagonally relative to the first square, M being greater than zero and less than or equal to n×n, and using values of the M pixels for generating a value of a fourth macro pixel.

The invention is particularly, but not exclusively, advantageous for reducing the pixel resolution of a digital image by binning pixels together and, thereby, obtaining a digital image having a reduced number of pixels.

It may be an advantage of the first aspect of the invention to generate macro pixels by selecting first, second and third pixels so that the optical centres of each of the corresponding first, second and third macro pixels are evenly distributed over the digital image, since this may provide an image quality of the downsized image which is less affected by pixel binning.

It may also be an advantage of the first aspect of the invention to generate the fourth macro pixel by selecting M pixels from the n×n fourth pixels outlining the fourth square oriented identically to and shifted diagonally relative to the first square, where M is greater than zero and less than or equal to n×n. By selecting M pixels out of n×n pixels of the fourth pixels it may be achieved that that the optical centres of all macro pixels are evenly distributed or almost evenly distributed. By providing an evenly or an almost evenly distribution of optical centres the image quality of the downsized image is less affected by pixel binning, since clustering of pixels is avoided.

It may be another advantage of the first aspect of the invention that the method of reducing the resolution of a digital image provides a method for reducing the amount of image pixels of the original image by downsizing the image using colour binning without reducing the image quality significantly.

It may be a further advantage of the first aspect of the invention that the method of reducing the resolution of a digital image improves the preservation of details of the downsized digital image relative to the original image.

Furthermore, it may be another advantage of the first aspect of the invention that the method generates less aliasing.

It may also be an advantage of the first aspect of the invention that the pixel layout of the downsized digital image is the same or almost the same as the pixel layout of the original image.

It may be another advantage of the first aspect of the invention that the optical centres of the first, second and third macro pixels are always evenly distributed independently of the value M of the selected M pixels.

In an embodiment the method of reducing a resolution of a digital colour image comprises selecting M pixels so that the resulting optical centre is displaced a distance D relative to a uniform grid, where the distance D depends on both M and positions of the M pixels relative to a fourth square enclosing the M pixels in a way so that:

for n×n being an uneven integer: M=n×n results in D=0, and for n×n being an even integer: M=n×n results in D>0 and M<n×n results in D=0 for some values of M.

Thus, when n×n is an uneven number, selection of all n×n pixels may provide an even distribution of all optical centres since the distance D equals zero. When n×n is an even number, it may be possible to select a number M of pixels which will provide an even distribution of optical centres since the distance D equals zero for that selection. Also, when n×n is an even number, other selections of M pixels, for example selection of all n×n pixels, may result in a distance D greater than zero.

In general there may be different possibilities of choosing the number M for obtaining a distance D equal to zero. It may be an advantage that it is always possible to choose a number M, for example M=1, so that all optical centres are evenly distributed. It may be another advantage that if M is chosen so that the distance D does not equal zero, the distance D is small enough not to reduce the image quality significantly.

In a particular embodiment the distance D depends on both M and positions of the M pixels relative to a fourth square in a way so that: for n×n=4 then M=1 results in D=0 and M>1 results in D>0. Thus, in particular when four pixels outlines a fourth square, selection of one pixel of the four pixels may provide an even distribution off all optical centres of all macro pixels.

In another particular embodiment the distance D depends on both M and positions of the M pixels relative to a fourth square in a way so that: for n×n=16 then M=1 and M=9 results in D=0. Thus, in particular when sixteen pixels outlines a fourth square, selection of either one pixel or nine pixels of the four pixels may provide an even distribution off all optical centres of all macro pixels.

Accordingly, whenever n×n is an uneven number all optical centres are evenly distributed and when n×n is an even number the optical centres are evenly distributed for some numbers M of the selected pixels. Thus, whether the number n×n is even or uneven and independent of the value of n×n it may be possible to obtain an even distribution of optical centres of all macro pixels.

In an embodiment of the method of reducing a resolution of a digital colour image the second square overlaps with the first square, the third square overlaps with the first square and the fourth square overlaps with one or more of the first, second and third squares.

In a further embodiment of the method of reducing a resolution of a digital colour image wherein n×n equals four and M equals one, the method comprises:

selecting one fourth pixel and using a value of the one fourth pixel for generating a value of a fourth macro pixel, the selected pixel and the resulting optical centre having a zero distance D relative to a uniform grid, the three remaining fourth pixels being disregarded.

Accordingly, by selecting one fourth pixel, for example one blue pixel, and disregarding the remaining three blue pixels, the optical centre of all macro pixels may be evenly distributed.

In another embodiment of the method of reducing a resolution of a digital colour image wherein n×n equals four and M equals four the method comprises:

selecting four fourth pixels and using values of the four fourth pixels to generate a value of a fourth macro pixel, the selected pixels providing an optical centre having an a distance D relative to a uniform grid.

Accordingly, by selecting four fourth pixels, for example four blue pixels, the optical centres of the red and green macro pixels may be evenly distributed whereas the optical centre of the blue macro pixels may be displaced a distance D relative to optical centres of the other macro pixels.

In yet another embodiment of the method of reducing a resolution of a digital colour image wherein n×n equals four and M equals three, the method comprises:

selecting a one fourth pixel having a zero distance D relative to a uniform grid, selecting two fourth pixels being nearest to the first selected one pixel and using the three selected fourth pixels to generate a value of a fourth macro pixel, the selected pixels providing an optical centre having a reduced distance D relative to a uniform grid, the one remaining fourth pixel being disregarded.

Accordingly, by selecting three fourth pixels, for example three blue pixels, the optical centres of the red and green macro pixels may be evenly distributed whereas the optical centre of the blue macro pixels may have a reduced distance D relative to optical centres of the other macro pixels.

In second aspect the invention relates to a method for reducing a resolution of a digital colour image by a factor of two in both a horizontal and a vertical direction, where the digital colour image is arranged in sets of 16 pixels, where each set comprising four first pixels, four second pixels, four third pixels and four fourth pixels constitutes a collection of pixels for generating values of four macro pixels comprising a first macro pixel, a second macro pixel, a third macro pixel and a fourth macro pixel, the method comprising:

recording a digital colour image using a colour mask;
for each set of 16 pixels:
selecting four first pixels and using values of the four pixels for generating a value of the first macro pixel;
selecting four second pixels and using values of the four pixels for generating a value of the second macro pixel;
selecting four third pixels and using values of the four pixels for generating a value of the third macro pixel;
where each of the first, second and third macro pixels has an optical centre determined by the relative positions of the pixels used to generate the value of the macro pixel;

wherein the pixels used to generate values of the first, second and third macro pixels are selected to position the optical centres of each of the first, second and third macro pixels at identical positions within each of the first, second and third macro pixels, so that these optical centres form a uniform grid, and generating a value of a fourth macro pixel using either one of:

- selecting one fourth pixel and using a value of the one fourth pixel for generating a value of the fourth macro pixel, the selected pixel providing an optical centre having a zero distance relative to the uniform grid, the three remaining fourth pixels being disregarded;
- selecting four fourth pixels and using values of the four fourth pixels to generate a value of the fourth macro pixel, the selected pixels providing an optical centre having a distance relative to the uniform grid; or
- selecting a first fourth pixel having zero distance relative to the uniform grid, selecting two fourth pixels being nearest to the selected first pixel and using the three selected pixels to generate a value of the fourth macro pixel, the selected pixels providing an optical centre having a reduced distance relative to the uniform grid, the one remaining pixel of the fourth pixel-type being disregarded.

Accordingly, the second aspect of the invention describes a method for reducing a resolution of a digital colour image by a factor of two in both a horizontal and a vertical direction in the case of 2×2 colour binning.

In an embodiment of the method of reducing a resolution of a digital colour image the colour mask may be a Bayer mask comprising one red pixel, two green pixels and one blue pixel.

In an embodiment of the method of reducing a resolution of a digital colour image, values of selected pixels of respective first, second, third and fourth pixels may be added for generating a value of the respective first, second, third and fourth macro pixel.

In another embodiment of the method of reducing a resolution of a digital colour image, values of selected pixels of respective first, second, third and fourth pixels may averaged for generating a value of the respective first, second, third and fourth macro pixel.

In a third aspect the invention relates to a system adapted for reducing a resolution of a digital colour image comprising pixels arranged in a colour mask of at least three different colours, the pixels comprise first pixels, second pixels, third pixels and fourth pixels, the system comprises selection means for, selecting n×n first pixels outlining a first square, and using values of these selected n×n pixels for generating a value of a first macro pixel, selecting n×n second pixels outlining a second square being rotated 45 degrees and shifted horizontally relative to the first square, and using values of these selected n×n pixels for generating a value of a second macro pixel, selecting n×n third pixels outlining a third square being rotated 45 degrees and shifted vertically relative to the first square, and using values of the n×n pixels for generating a value of a third macro pixel, where each of the first, second and third macro pixels has an optical centre determined by the relative positions of the pixels used to generate the value of the macro pixel, wherein the pixels used to generate values of the first, second and third macro pixels are selected to position the optical centres of each of the first, second and third macro pixels at identical positions within each of the first, second and third macro pixels, so that these optical centres form a uniform grid, and said system further comprising selection means for, selecting M pixels from n×n fourth pixels outlining a fourth square oriented identically to and shifted diagonally relative to the first square, M being greater than zero and less than or equal to n×n, and using values of the M pixels for generating a value of a fourth macro pixel.

In a fourth aspect the invention relates to a computer program product capable of reducing a resolution of a digital colour image being recorded using a colour mask, where the digital colour image comprises pixels arranged in the colour mask of at least three different colours, the pixels comprise first pixels, second pixels, third pixels and fourth pixels, said computer program product being adapted to perform the method according to the first aspect or the second aspect.

In a fifth aspect the invention relates to an electronic chip device adapted for reducing a resolution of a digital colour image comprising pixels arranged in a colour mask of at least three different colours, the pixels comprise first pixels, second pixels, third pixels and fourth pixels, the electronic chip device comprises selection means for adapted for carrying out at least one of steps a, b, c and d, a) selecting n×n first pixels outlining a first square, and using values of these selected n×n pixels for generating a value of a first macro pixel, b) selecting n×n second pixels outlining a second square being rotated 45 degrees and shifted horizontally relative to the first square, and using values of these selected n×n pixels for generating a value of a second macro pixel, c) selecting n×n third pixels outlining a third square being rotated 45 degrees and shifted vertically relative to the first square, and using values of the n×n pixels for generating a value of a third macro pixel, d) selecting M pixels from n×n fourth pixels outlining a fourth square oriented identically to and shifted diagonally relative to the first square, M being greater than zero and less than or equal to n×n, and using values of the M pixels for generating a value of a fourth macro pixel, where each of the first, second and third macro pixels has an optical centre determined by the relative positions of the pixels used to generate the value of the macro pixel, and wherein the pixels used to generate values of the first, second and third macro pixels are selected to position the optical centres of each of the first, second and third macro pixels at identical positions within each of the first, second and third macro pixels, so that these optical centres form a uniform grid.

Thus, the electronic chip device, for example a CCD chip, may be designed so that for example the selection of first pixels and the generation of a value of a first macro pixel is carried out by the electronic chip device, whereas the selection of second, third and fourth pixels and the generation of values of second, third and fourth macro pixels is carried out by an external processing device or an other image processing device. In general, any of steps a, b, c and d (eg. b and c) may be carried out in the electronic chip device, whereas the remaining steps not carried out in the electronic chip device (eg. a and d) may be carried out by an external processing device or an other image processing device.

Furthermore, the electronic chip device and in particular the selection means may be designed so that the generation of a value of a macro pixel is performed partly on basis of any number of pixels being processed in the electronic chip device and partly on basis of a remaining number of pixels being processed for example in an external processing device. For example the value of one out of n×n selected pixels may be processed in the chip, and the remaining n×n−1 or M−1 pixels may be processed by an external processing device. In another example the values of two out of n×n selected pixels may be processed in the chip, and the remaining n×n−2 or M−2 pixels may be processed by an external processing device. In a general example the Q values of Q pixels out of n×n selected pixels may be processed in the chip, and the remaining n×n−Q or M−Q pixels may be processed by one or more external processing devices or other image processing devices. The processing of values in the chip or the external processing devices may comprise adding values, averaging values or and other mathematical processing of values.

Accordingly, any of steps a, b, c and d may be implemented so that for example in step "a" in 2×2 colour binning, the values of two first pixels may be processed in the electronic chip, and the remaining 2 first pixels may be processed by an external processing device. Any of the remaining steps b, c and d may be similarly distributed so that some pixels are processed by the electronic chip and the remaining pixels are processed by an external processing device. Alternatively, one or more of steps b, c and d may be implemented exclusively in the electronic chip device and/or exclusively in the external processing device so that, for example, in step "b" all four second pixels are processed in the external processing device; or for example in step "d" all M fourth pixels are processed in the external processing device.

It may be an advantage that the electronic chip device is configured for carrying out at least one of steps a, b, c and d so that other steps of a, b, c and d can be carried out by external processing devices, thereby, enabling more flexible design possibilities of the electronic chip device.

In an embodiment the invention relates to an electronic chip device according to the fourth aspect, for use in a camera or system providing any remaining step(s) of steps a, b, c and d not carried out by the electronic chip device, the electronic chip device being configured to provide output image data comprising values of macro pixels corresponding to any of steps a, b, c and d carried out by the electronic chip device, and values of any first, second, third and/or fourth pixels corresponding to any of steps a, b, c and d not carried out by the electronic chip device, wherein the output image data is formatted so that a camera, a system or an external processing device configured for reducing a resolution of a digital colour image can readily distinguish between values of macro pixels and any values of first, second, third and/or fourth pixels in the output image data.

Thus, the electronic chip device may be configured to provide output image data comprising only values of some of the first, second, third and fourth macro pixels (eg. second and third macro pixels) and values of only some of the first, second, third and fourth pixels (eg. first and fourth pixels). Accordingly, any other system, for example a camera or an external processing device may be configured for generating the remaining macro pixels not generated by the electronic chip device (eg. first and fourth macro pixels) on basis of values of pixels provided by the electronic chip device (eg. values of first and fourth pixels).

In an embodiment related to the sixth aspect of the invention the electronic chip device may provide output image data formatted in accordance with a predetermined format for exchange of data between an electronic chip device and any-one of a camera, a system comprising the electronic chip or an external processing device.

Thus, by providing the output image data in a particular data format the electronic chip device is capable of exchanging data with for example an external processing device.

In summary the basic idea of an embodiment of the invention is to provide a method for reducing the pixel resolution of a digital image by binning pixels together to form macro pixels. The digital image comprises pixels arranged in a colour mask of at least three different colours. The colour mask can be a Bayer mask comprising one red pixel, two green pixels and one blue pixel arrange in a 2 by 2 matrix. The pixel binning method comprises selecting a number of pixels of each colour. For example, in order to obtain a factor two resolution reduction, four red pixels can be binned for generating a red macro pixel and eight green pixels can be binned for generating two green macro pixels. By selecting for example only one blue pixel and using that pixel for generating a blue macro pixel the optical centres of the macro pixels will be evenly distributed over the downsized image. By reducing the resolution with a factor of two, the amount of pixels of the downsized image is reduced with a factor of four.

The first, second, third, fourth, fifth and sixth aspects of the present invention, as well as any preferred features or elements of these, may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

DETAILED DESCRIPTION OF THE INVENTION

Figure 1:
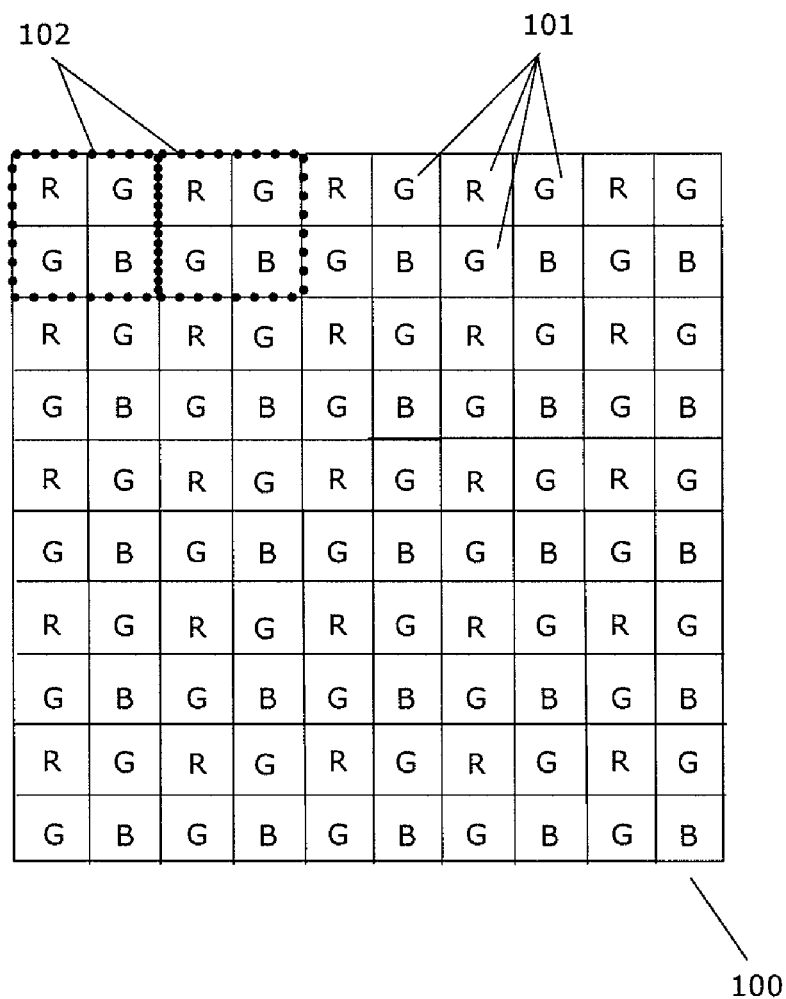
FIG. 1 illustrates a photoelectric image sensor 100, for example a CCD sensor or a CMOS sensor.

FIG. 1 illustrates a photoelectric image sensor 100, for example a CCD sensor or a CMOS sensor. The image sensor 100 comprises a number of photo sensitive pixels 101 arranged for example in a matrix as illustrated. In order to make the pixels sensitive to different colours, the pixels may be covered with transparent material of different colours. In FIG. 1, the pixels are covered with red R, green G and blue B colour filters which are arranged in a colour mask 102 known as a Bayer mask. By combining the red, blue and the two green pixels in the colour mask 102 in a post processing procedure, the pixels 101 are converted into a colour image.

For reasons of convenience, in the following, pixels covered with transparent material of a particular colour, such as red R, will be referred to as colour pixels, such as red pixels. The colour pixels may be arranged in other types of colour masks, for example CMY colour masks. Also, the colours of the colour mask may deviate from the example shown in FIG. 1, for example the green colour of pixels in the first row may deviate more or less relative to the green colour of pixels in the second row.

Figure 2:
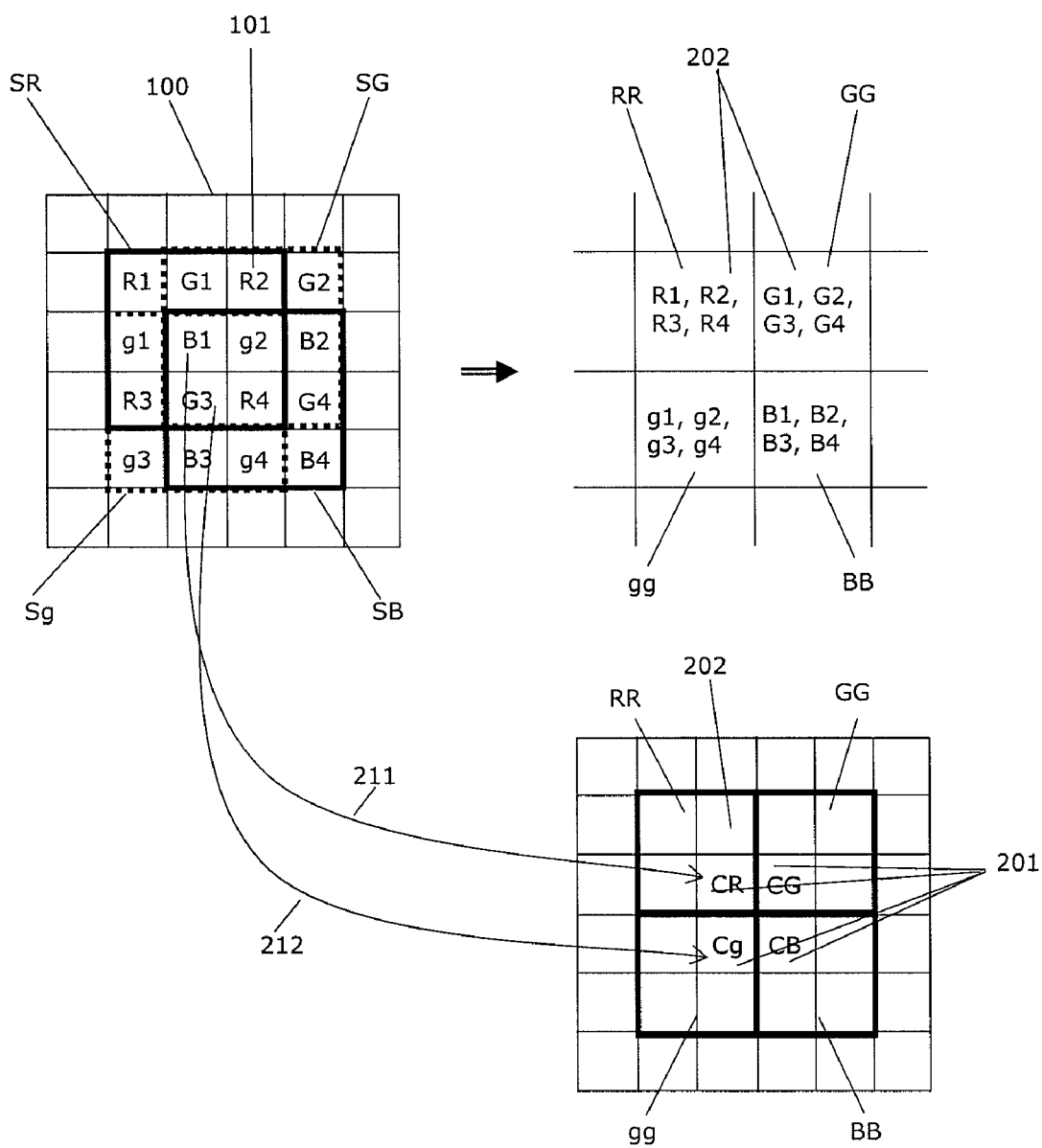
FIG. 2 illustrates a prior art method for reducing the amount of pixels with a ratio of four by using a 2×2 colour binning method.

FIG. 2 illustrates a method for reducing the amount of pixels with a ratio of four by using a 2×2 colour binning method for generating binned pixels 202, also referred to as macro pixels 202, as disclosed in US2006/0203113. As illustrated four red pixels, R1-R4, are binned together to form a red macro pixel RR, four green pixels, G1-G4, are binned together to form a green macro pixel GG, other four green pixels, g1-g4, are binned together to form another green macro pixel gg, and four blue pixels, B1-B4, are binned together to form a blue macro pixel BB.

In general by binning together pixels, n by n, referred to as n×n colour binning, the amount of pixels in the downsized image is reduced with "n multiplied by n", and the resolution of the downsized image is reduced with n in the horizontal and vertical directions. For example, 2×2 colour binning reduces the amount of pixels with four and reduces the resolution with two in horizontal and vertical directions.

In this description colour binning should be understood as combining pixels or values of pixels for generating a macro pixel or a value of a macro pixel. The pixels or the values of pixels can for example be combined by adding, averaging or using other mathematical combining functions for generating the macro pixel or the value of the macro pixel. Furthermore, in this description colour binning and pixel binning are used as synonyms for the same method for reducing the resolution of a digital colour image.

The strategy for selecting pixels to be binned is illustrated in FIG. 2, which shows that all red pixels R1-R4 enclosed by the square SR are binned into a macro pixel RR, four green pixels G1-G4 enclosed by the square SG are binned into a macro pixel GG, other four green pixels g1-g4 enclosed by the square Sg are binned into a macro pixel gg, and all blue pixels B1-B4 enclosed by the square SB are binned into macro pixel GG.

For reasons of convenience green pixels related to one green macro pixel GG are referred to using capital letters G1-G4, whereas the other green pixels related to the other green macro pixel gg are referred to using lower-case letters g1-g4. Thus, it should be understood that pixels G1-G4 and g1-g4 and macro pixels GG and gg have the same green colour. However, in special cases the colours of distinct green pixels may deviate.

The macro pixels RR, GG, gg and BB are characterised by optical centres 201 as illustrated in FIG. 2. The location of optical centre CR of the red macro pixel RR corresponds to the "centre of mass" of the pixels R1-R4 as illustrated by arrow 211. Similarly the optical centre Cg of the green macro pixel gg corresponds to the "centre of mass" of the pixels g1-g4. As a result of the prior art method of colour binning, the optical centres 201 tend to cluster in a 2×2 block as illustrated by optical centres CR, CG, Cg, CB.

Figure 3:
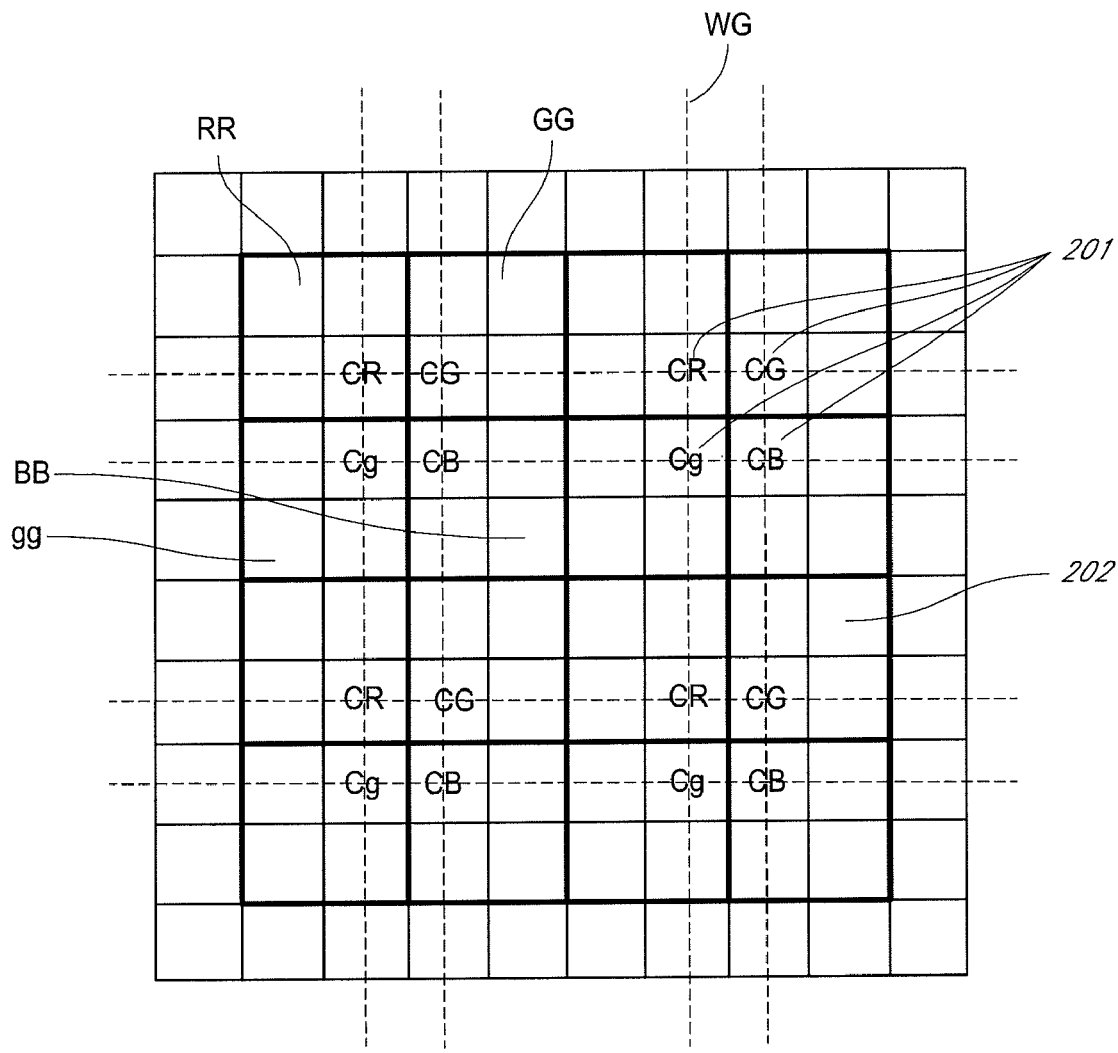
FIG. 3 illustrates the result of a prior art method of colour binning.

FIG. 3 illustrates the result of the prior art method of colour binning for a larger part of the pixel sensor 100. The optical centres 201 clusters in 2×2 blocks. The non-uniformity of the distribution of colour centres over the area of the pixel sensor 100 is illustrated by the non-uniform wire grid WG. The picture which results from post processing the macro pixels 202 looks bad or requires so much additional smoothing that details are lost because of the non-uniform distribution of optical centres 201.

Figure 4:
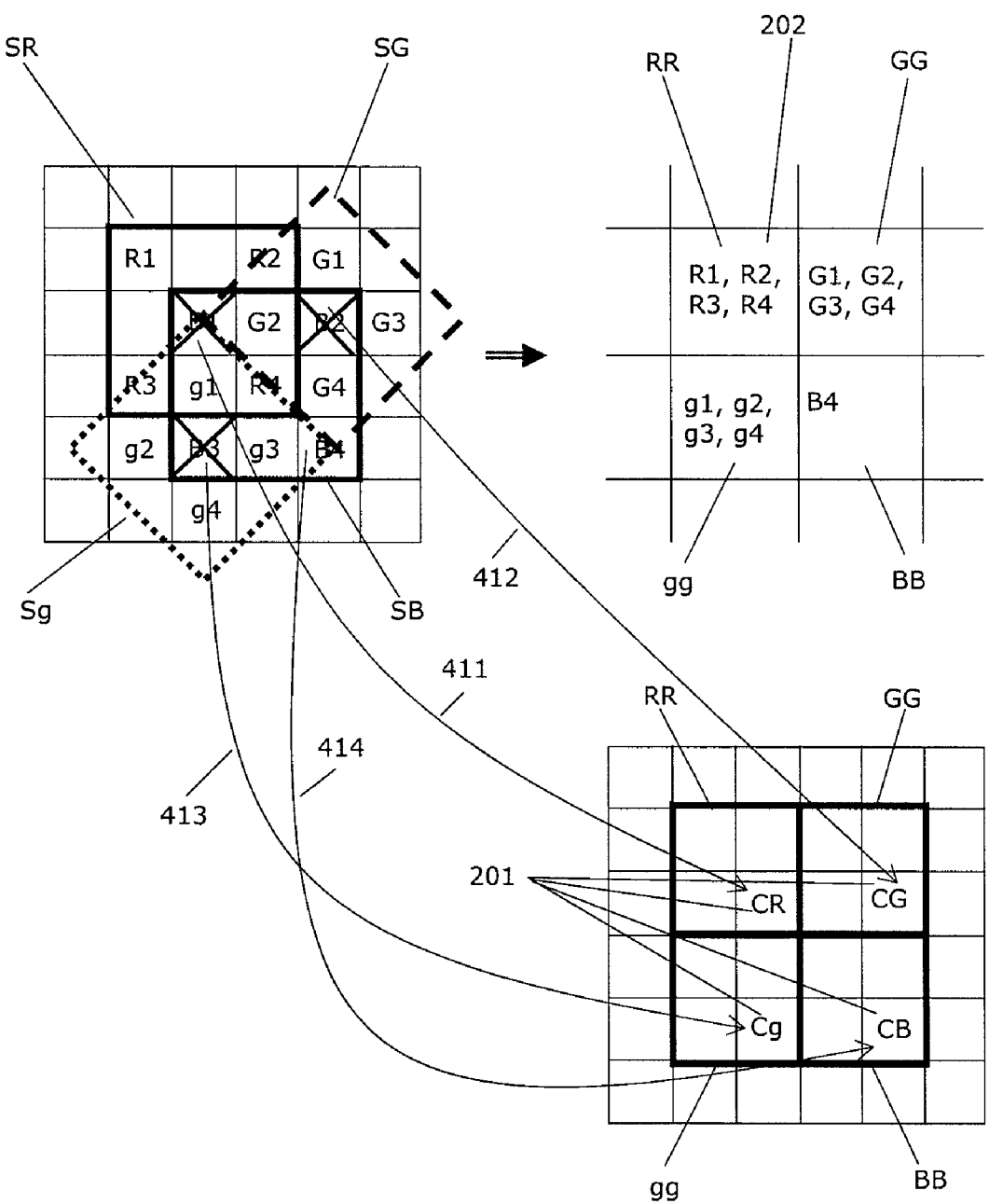
FIG. 4 illustrates the improved method for colour binning of pixels according to an embodiment of this invention.

FIG. 4 illustrates the improved method for colour binning of pixels according to an embodiment of this invention. The method illustrated in FIG. 4 shows as an example of 2×2 pixel binning. However, the method is equally capable of other pixel reductions, for example 3×3, 4×4 or in general n×n pixel binning.

FIG. 4 shows the selection of four red pixels R1-R4 (first pixels) which outlines a first square SR. The values of the red pixels R1-R4 are used for generating the value of the macro pixel RR (the first macro pixel). The value of a pixel 101 may be any analogue electric value, digital value or electron count representative of an intensity of light exposed on the pixels during exposure of an image or other physical value. Accordingly, the value of the macro pixel also corresponds to an intensity of light. The value of the macro pixel can for example be generated by averaging or summing the values of the pixels 101.

In order to obtain a uniform distribution of colour centres 201 of all macro pixels RR, GG, gg, BB, the remaining pixels 101 are selected as follows:

Four green pixels (second pixels) G1-G4 outlining a second square SG are selected and the values of the four green pixels are used to generate a value of the macro pixel GG (second macro pixel). The second square SG is rotated 45 degrees and shifted horizontally relative to the first square SR.

Four green pixels g1-g4 (third pixels) outlining a third square Sg are selected and the values of the four green pixels are used to generate a value of the macro pixel gg (third macro pixel). The third square Sg is rotated 45 degrees and shifted vertically relative to the first square SR.

One blue pixel B4 (fourth pixel) is selected from the four blue pixels B1-B4 which outlines a fourth square SB. The value of the blue pixel B4 is used to generate a value of the macro pixel BB (fourth macro pixel). The fourth square SB is oriented identically to the first square SR. The remaining blue pixels B1-B3 are disregarded as indicated by crossing out these pixels in FIG. 4.

The squares SR, SG, Sg, SB, as well as references to positions and rotations of the squares are used only for visualising how the pixels 101 are selected. Clearly, the selection of pixels may be explained otherwise, for example by defining the selection in an algorithm.

Thus, in the example illustrated in FIG. 4, the digital colour image is arranged in sets of 16 pixels comprising 4 first pixels of red colour, 4 second pixels of green colour, 4 third pixels of green colour and 4 fourth pixels of blue colour.

Also, the term "selection of pixels" is introduced for eased explanation of the method of pixel binning and, therefore, "selection of pixels" should not necessarily be understood as an action of selecting. Indeed, the method does not require pixels to be selected, but only requires values of particular pixels 101 to be combined, eg. by summing values of particular pixels into a value of a corresponding macro pixel 202.

As a result of the described method of pixel binning, the three optical centres CR, CG and Cg are located in the same lower, right corner of each macro pixel RR, GG and gg. The formations of the optical centres are indicated by arrows 411-413. Thus, the three colour centres CR, CG and Cg are uniformly distributed.

Since only one blue pixel B4 is selected, and since the position of the blue pixel B4 matches the locations of optical centres, all four colour centres CR, CG, Cg and CB are uniformly distributed.

Since the human eye is less sensitive to imperfections in blue colours than green colours the quality of the image is not significantly reduced by selecting only one blue pixel B4 instead of all four blue pixels B1-B4.

Figure 5:
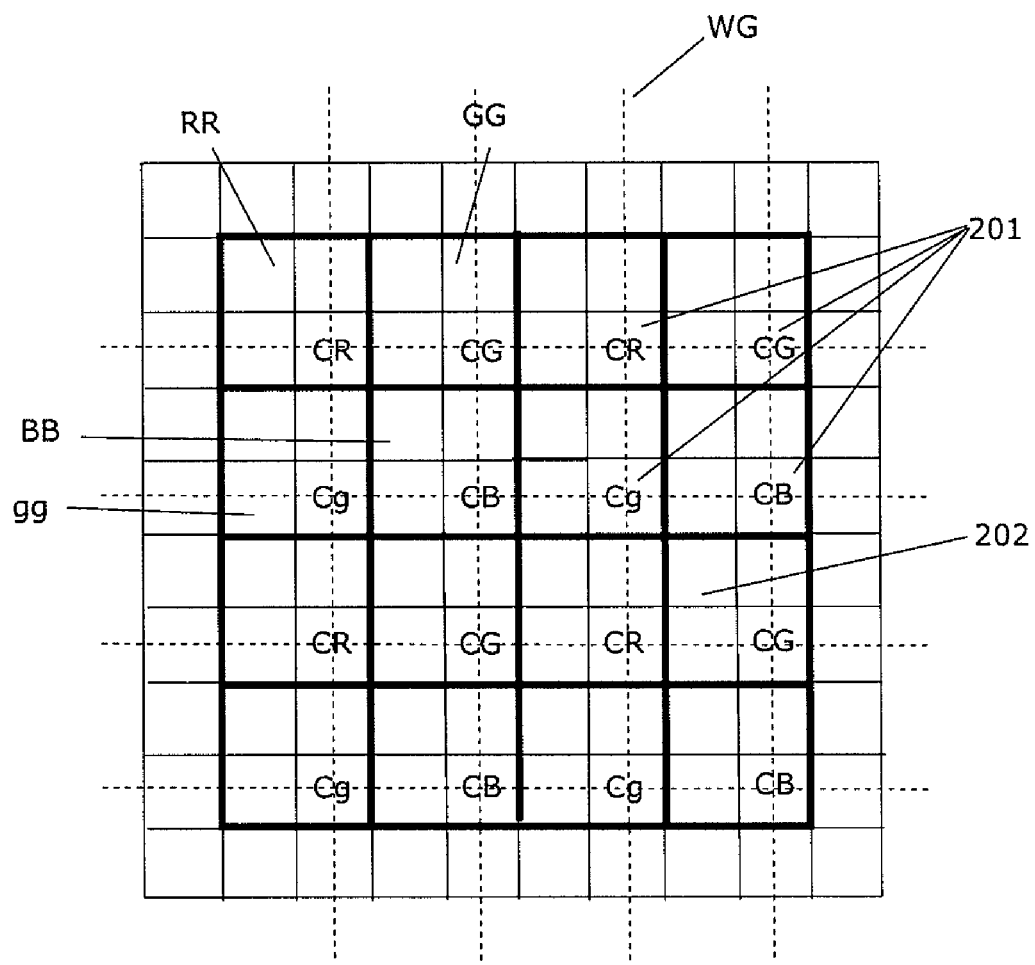
FIG. 5 shows the resulting distribution of optical centres 120 when the pixel binning method described in relation to FIG. 4 is used.

FIG. 5 shows the resulting distribution of optical centres 120 when the pixel binning method described in relation to FIG. 4 is used. The uniformity of the distribution of colour centres 201 over the area of the pixel sensor 100 is illustrated by the uniform wire grid WG.

The pixel binning method described in relation to FIG. 4 may of course be generalised so that any of the other pixel colours are used in place of the blue pixels. For example, four blue pixels B1-B4, four green pixels G1-G4 and four other green pixels g1-g4 may be selected to generate values of macro pixels 202, whereas one red pixel, eg. pixel R1, is selected to generate a value of the red macro pixel RR.

Figure 6:
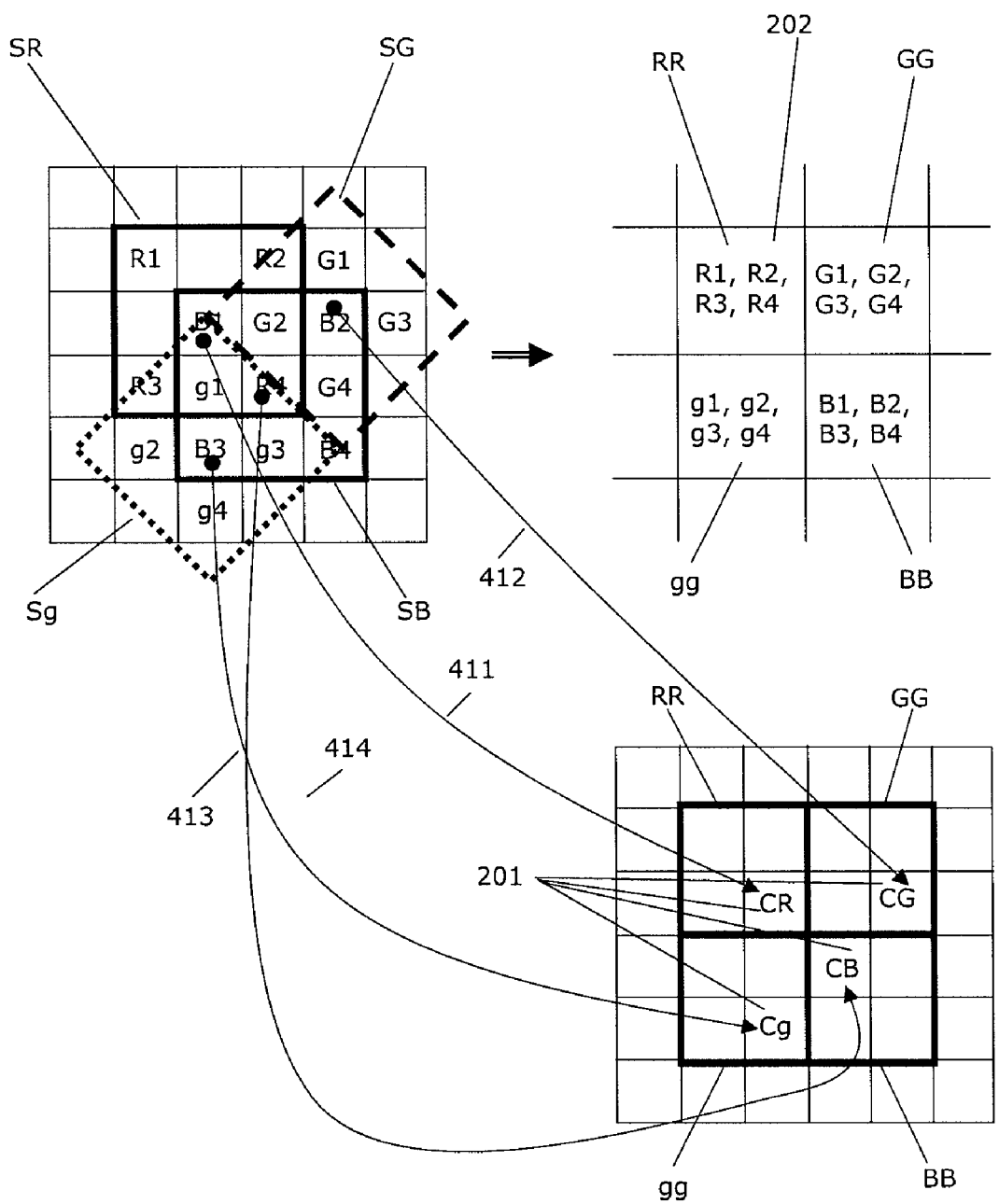
FIGS. 6 and 7 show alternative aspects of the method of pixel binning described in relation to FIG. 4.
Figure 7:
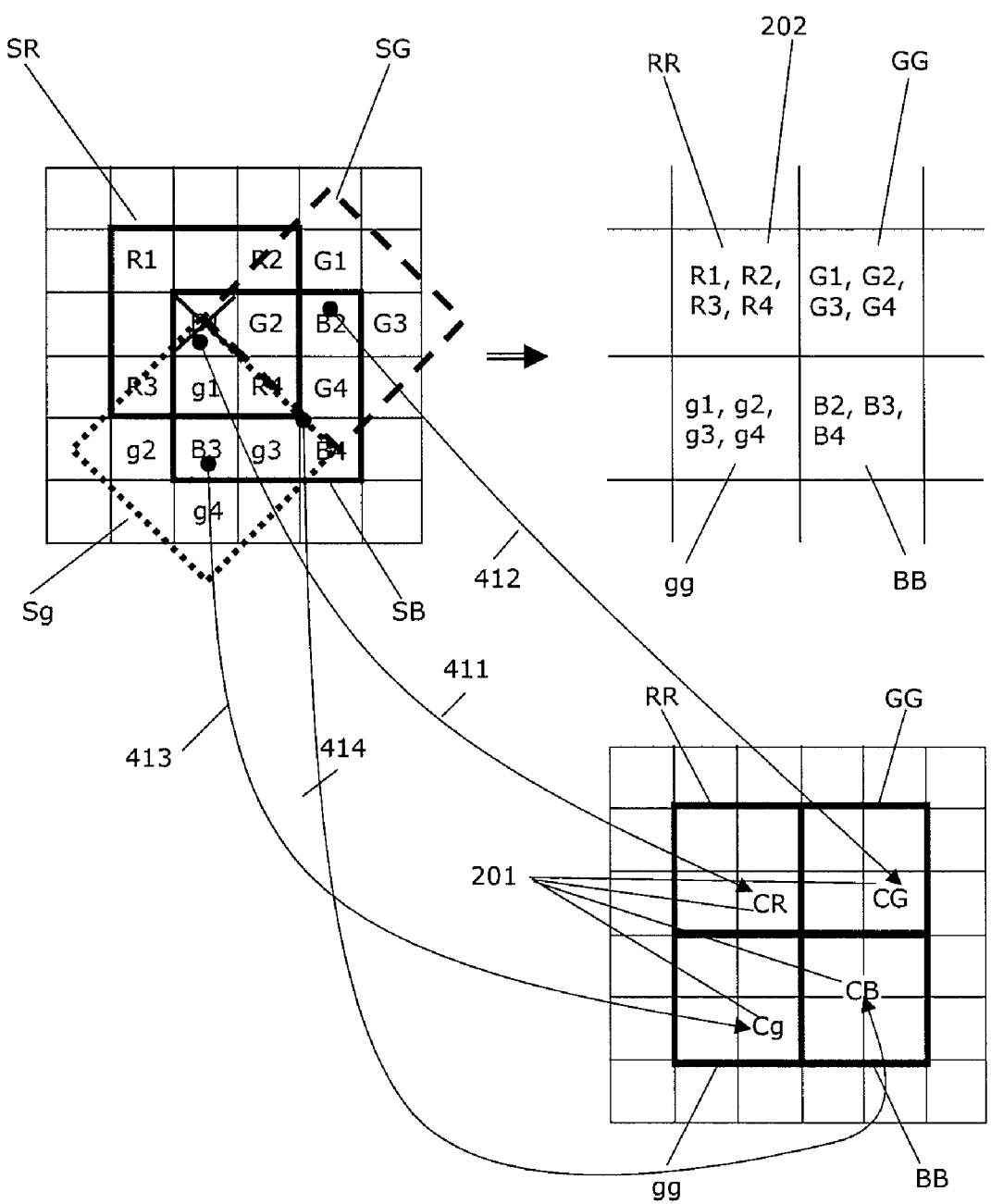

FIGS. 6 and 7 show alternative aspects of the method of pixel binning described in relation to FIG. 4. In FIG. 6, instead of selection only one blue pixel B4, all four pixels B1-B4 are selected for generating a value of the macro pixel BB. Since all four pixels B1-B4 are selected, the resulting optical centre CB does not match the uniform distribution of optical centres CR, CG and Cg. In FIG. 7, three pixels B2-B4 are selected for generating a value of the macro pixel BB. Since three pixels B2-B4 are selected, the resulting optical centre CB is closer to match the uniform distribution of optical centres CR, CG and Cg as compared to the situation where all four blue pixels B1-B4 are selected.

Figure 8:
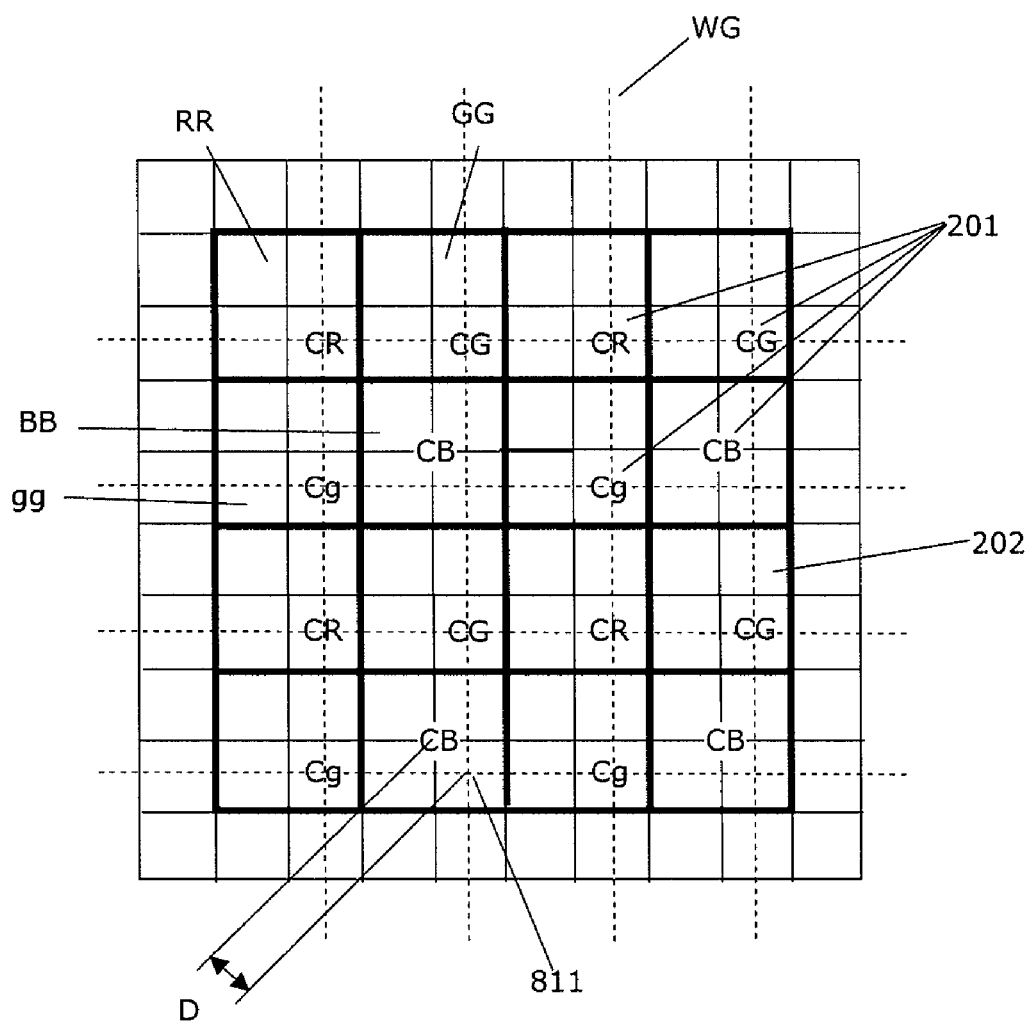
FIG. 8 shows the effect of selecting four or three blue pixels as shown in relation to FIGS. 6 and 7.

The effect of selecting four or three blue pixels as shown in relation to FIGS. 6 and 7 is shown in FIG. 8. The optical centre CB of the blue macro pixel BB is displaced a distance D relative to the wire grid WG. The effect of non-zero displacements D may be partly or completely compensated for in a post processing procedure where the colour binned image is further processed.

The pixel binning method described in relation to FIGS. 6 and 7 may of course be generalised similar to the generalisation of the pixel binning example described in relation to FIG. 4 so that any of the other pixel colours are used in place of the blue pixels. That is, instead of selecting three or four blue pixels, three or four red pixels may be selected.

Figure 9:
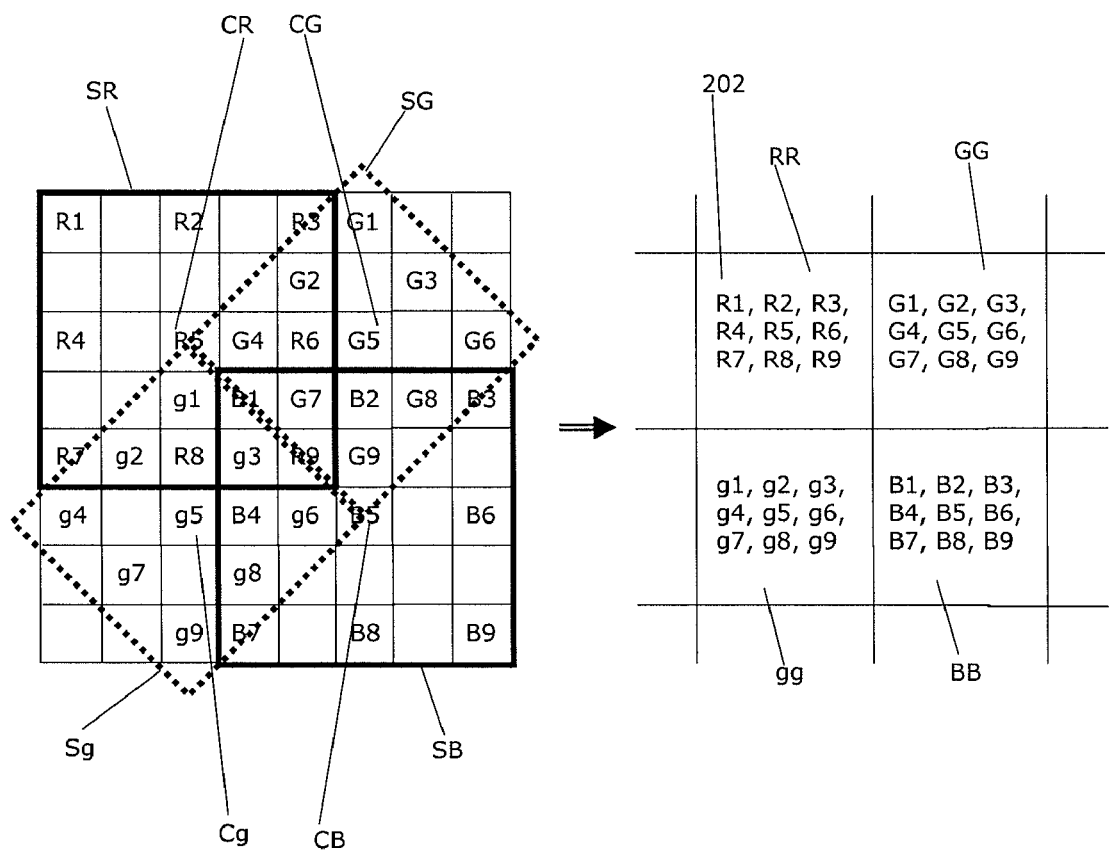
FIG. 9 shows an example of 3×3 colour binning for achieving a factor nine pixel reduction.

FIG. 9 shows an example of 3×3 colour binning for achieving a factor nine pixel reduction. The method for 3×3 colour binning proceeds similar to 2×2 colour binning. However, since each square (SR, SG, Sg, SB) contains an uneven number of pixels to be binned (eg. nine red pixels R1-R9 for square SR) and since binning of that uneven number of pixels for each square (SR, SG, Sg, SB) inherently provides a uniform distribution of optical centres it is not required to disregard pixels in any square. Thus, for 3×3 colour binning the method proceeds as follows:

Nine red pixels R1-R9 outlining a first square SR are selected and the values of the nine red pixels are used to generate a value of the red macro pixel RR.

Nine green pixels G1-G9 outlining a second square SG are selected and the values of the nine green pixels are used to generate a value of the green macro pixel GG. The second square SG is rotated 45 degrees and shifted horizontally relative to the first square SR.

Nine green pixels g1-g9 outlining a third square Sg are selected and the values of the nine green pixels are used to generate a value of the green macro pixel gg. The third square Sg is rotated 45 degrees and shifted vertically relative to the first square SR.

Nine blue pixels B1-B9 outlining a fourth square Sg are selected and the values of the nine blue pixels are used to generate a value of the blue macro pixel BB. The fourth square SB is oriented identically to the first square SR.

For any embodiments of colour binning, the order of selecting pixels of a particular colour is not essential and may therefore be permuted.

The example of 3×3 colour binning illustrated in FIG. 9 can easily be generalised to n×n colour binning where n is an uneven number. For example 5×5 colour binning comprises selection of 25 pixels of a particular colour for each square.

The examples of 2×2 colour binning illustrated in FIGS. 4-8 can be generalised to n×n colour binning where n is an even number.

Figure 10:
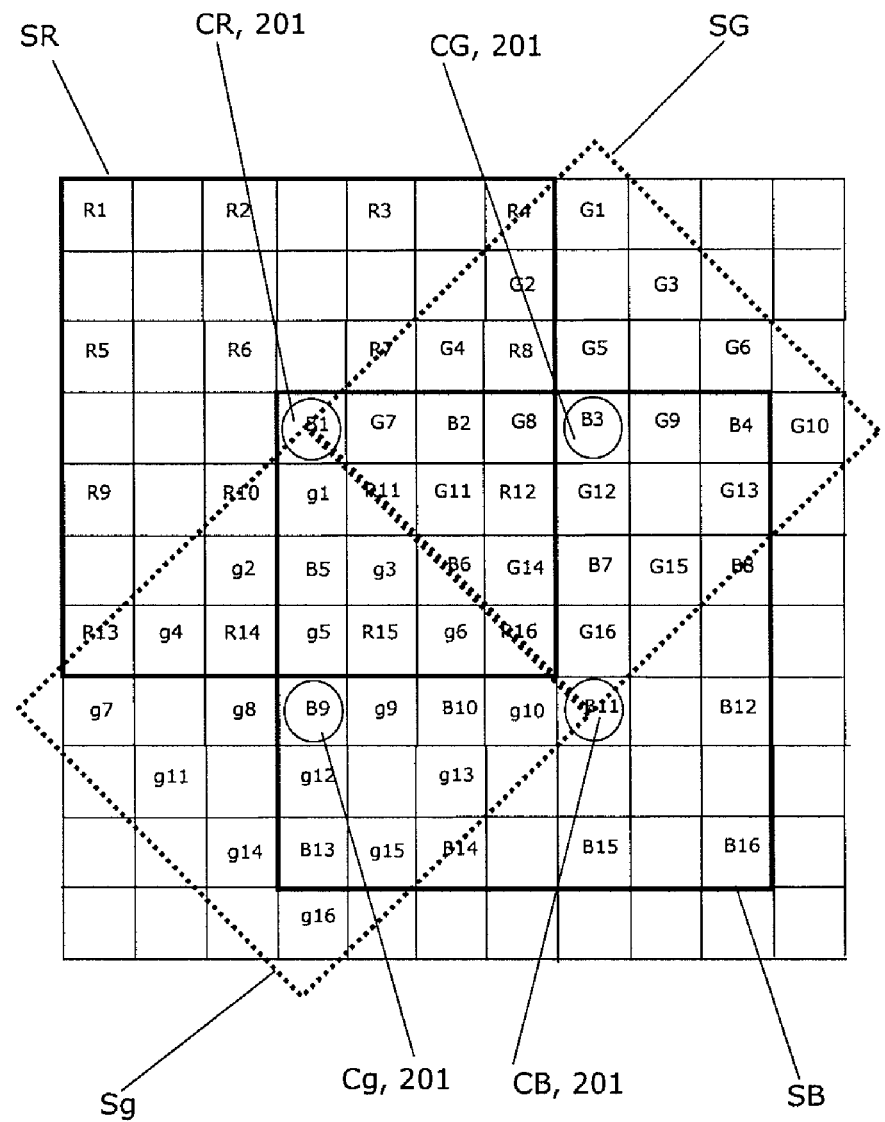
FIG. 10 shows an example of 4 by 4 colour binning.

FIG. 10 shows an example of n×n=4×4 colour binning where the pixels of the squares SR, SG and Sg are selected similar to the examples given in FIGS. 4-7. For example the value of the red macro pixel can be generated from the values of the selected pixels R1-R16 enclosed by the square SR.

The pixels used for generating the value of the blue macro pixel BB and which are enclosed by the square SB can be selected in various ways. In order to maintain a uniform distribution of all optical centres of CR, CG, Cg and CB, pixel B11 can be selected and the remaining blue pixels B1-B10 and B12-B16 can be disregarded. Alternatively, the blue pixels B6-B8, B10-B12 and B14-B16, can be selected and the remaining blue pixels B1-B4, B5, B9 and B13 can be disregarded.

It is also possible to select all blue pixels B1-B16 or any subset of the blue pixels so that the resulting optical centre CB of the blue macro pixel BB is displaced a distance D relative to the grid WG.

Thus, from the examples given in FIGS. 4 and 10 of n×n pixel binning where n×n is an even number it is clear that the method can generalised. That is, in general when n×n is an even number, n×n pixels are selected for each of three squares, eg. squares SR, SG and Sg, and M pixels are selected for the last square, eg. square SB. The values of the selected pixels are used for generating values of corresponding macro pixels RR, GG, gg and BB. When M pixels are selected out of n×n pixels enclosed in a square, n×n−M pixels are disregarded.

Depending on the value of M, the displacement D relative to the uniform wire grid WG will either be equal to zero or greater than zero. For example, for M=n×n, D will be greater than zero for even values of n×n.

Figure 11:
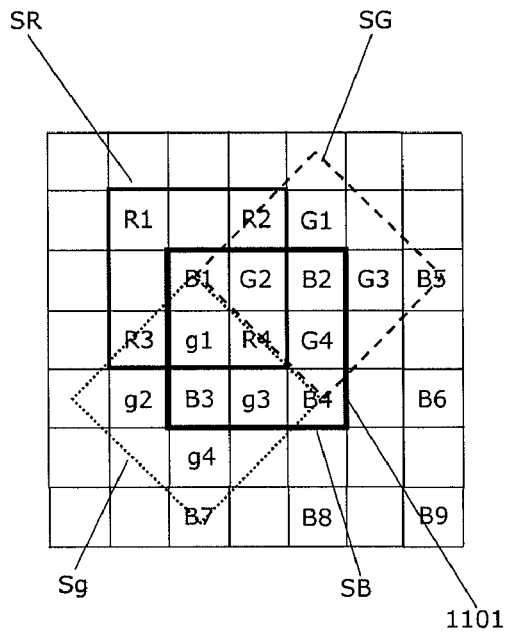
FIG. 11 shows alternative examples of selecting the fourth square enclosing blue pixels.
Figure 11:
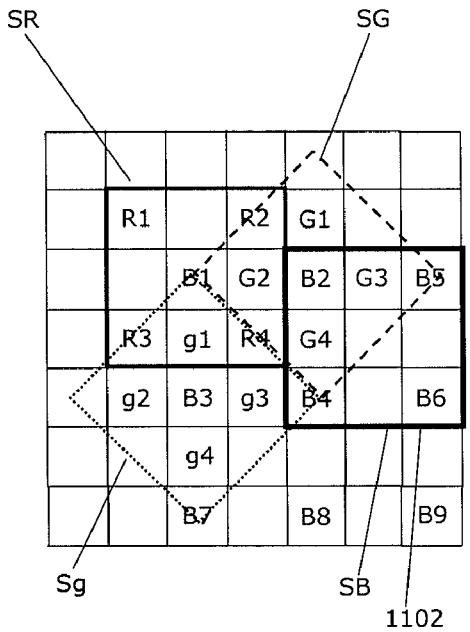
Figure 11:
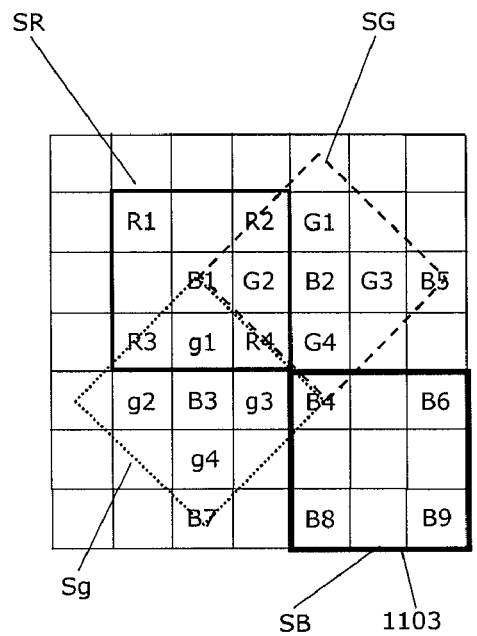
Figure 11:
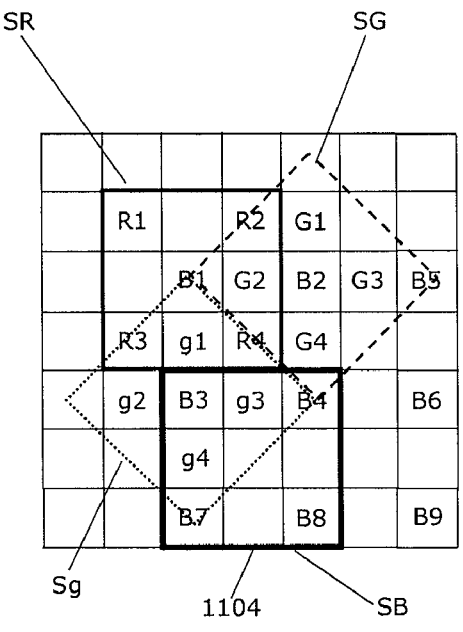

FIG. 11 shows alternative examples of selecting four blue pixels for outlining the fourth square SB. FIG. 11 shows three positions 1102-1104 of the square SB which are alternatives to position 1101. All four positions 1101-1104 provides the possibility of selecting one blue pixel B4 for generating a value of the macro pixel BB so that the optical centres of all macro pixels (RR,GG,gg,BB) are evenly distributed. Alternatively, pixels B2, B4 and B6 could be selected for position 1102; pixels B4, B6 and B8 could be selected for position 1103; and pixels B3, B4 and B8 could be selected for position 1104, where values of the three selected blue pixels are used for generating a blue macro pixel BB having an optical centre CB, 201 being displaced a distance D relative to the grid WG. Clearly, it is also possible to select all four blue pixels in positions 1101-1104. The possibility of four different positions of the fourth square SB is applicable for all even values of n×n, for example for 4×4 pixel binning.

For general n×n (to be read as n times n) pixel binning where n×n is even or uneven, the resolution of the downsized image is reduced with a factor n in both the horizontal and the vertical direction, and the number of pixels in the down sized image is reduced with a factor of n×n. The dimension of the square (SR, SG, Sg, SB) which encloses the selected n×n pixels is 2×n−1 on both sides. The second square SG is shifted n pixels positions horizontally relative to the first square SR and the third square SG is shifted n pixels positions vertically relative to the first square SR. For general n×n pixel binning, the fourth square SB is shifted as follows:

for n×n uneven, the fourth square is shifted n pixels horizontally and n pixels vertically;

for n×n even, the fourth square is either shifted n−1 pixels horizontally and n−1 pixels vertically (position 1101); n+1 pixels horizontally and n−1 pixels vertically (position 1102); n+1 pixels horizontally and n+1 pixels vertically (position 1103); or n−1 pixels horizontally and n+1 pixels vertically (position 1104). It should be understood that whenever reference is made to a statement such as the fourth square SB is shifted diagonally relative to the first square SR, this should be construed as including any the mentioned possibilities of shifting the fourth square, that is, positions 1101-1104 shown in FIG. 11.

Figure 13:
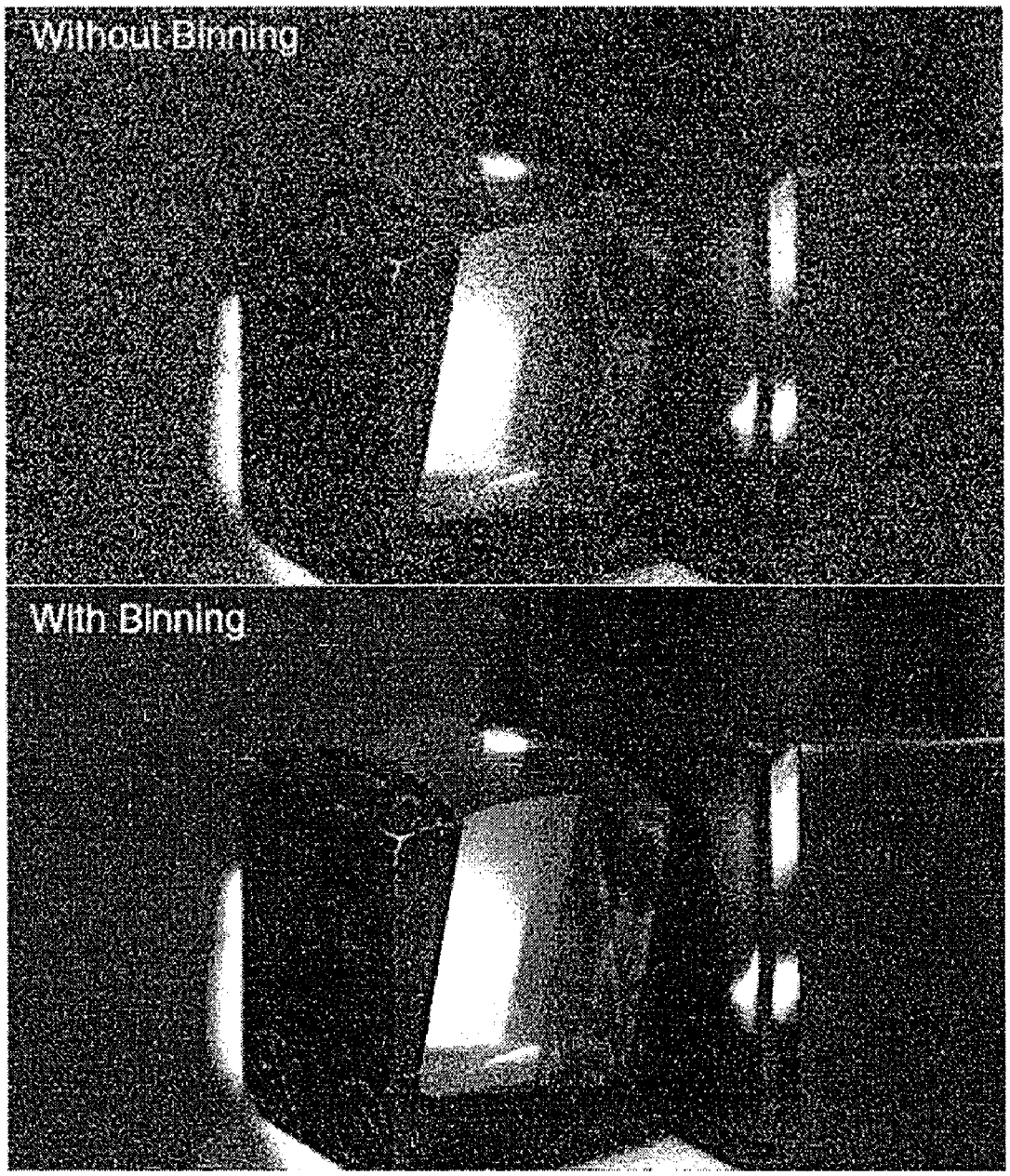
FIG. 13 illustrates the effect of colour binning—the upper image shows the effect of reducing the image resolution with a factor of two using sub-sampling and the bottom image shows the effect of 2×2 colour binning according to the method illustrated in FIG. 6.

FIG. 13 illustrates the effect of colour binning. The upper image shows the effect of reducing the image resolution with a factor of two using sub-sampling, that is every second RGB mask 102 is simply skipped. The bottom image shows the effect of 2×2 colour binning according to the method illustrated in FIG. 6; 2×2 colour also reduces the image resolution with a factor of two. The upper image clearly contains a lot of noise contrary the bottom image.

Figure 14:
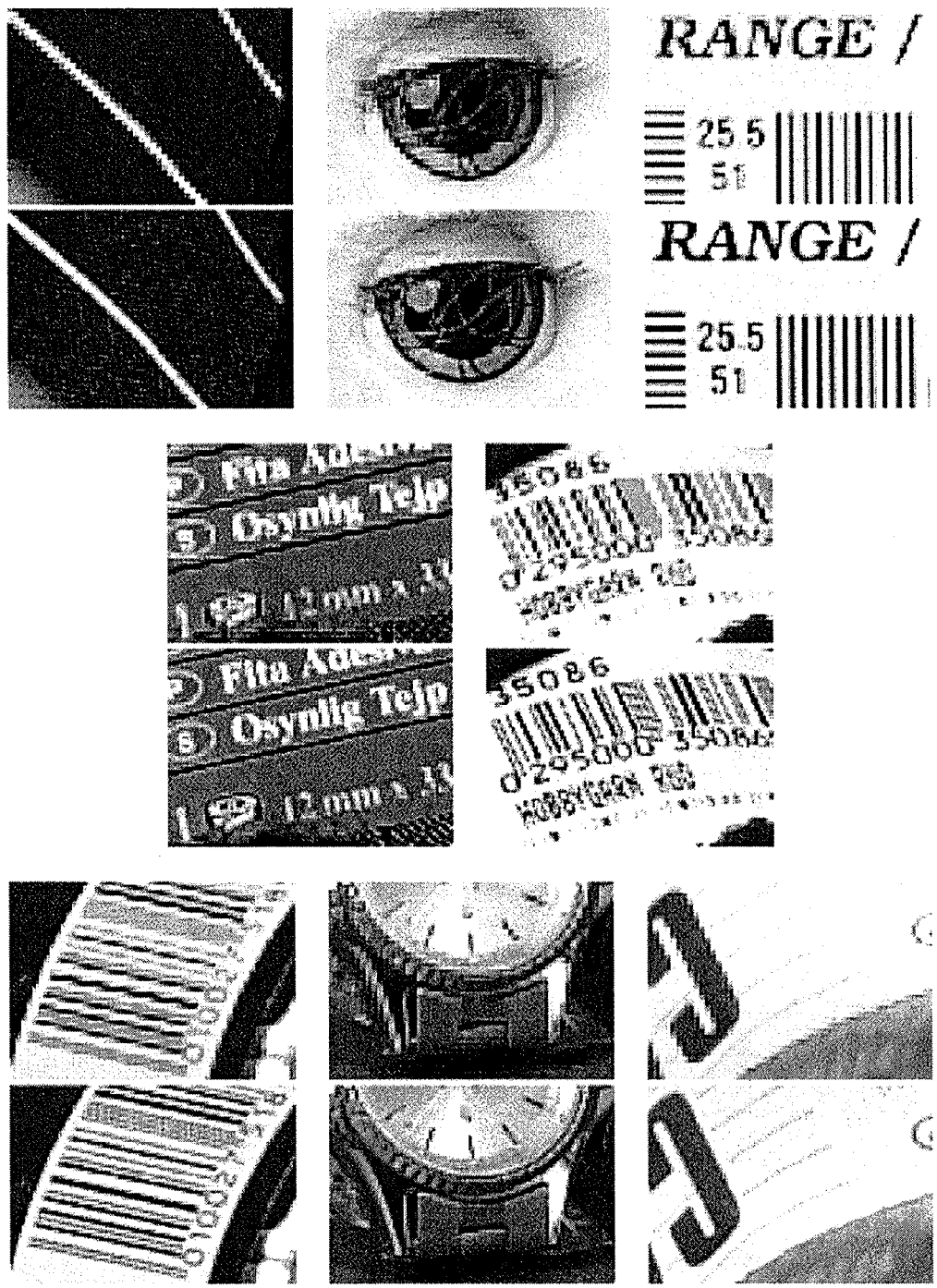
FIG. 14 illustrates the effect of colour binning according to this invention relative to prior art colour binning methods as illustrated in FIG. 2.

FIG. 14 illustrates the effect of colour binning according to this invention relative to prior art colour binning methods as illustrated in FIG. 2. The uppermost images show the image results using the prior art colour binning, whereas the bottom images show the image results using the method of colour binning according to this invention. The bottom images show the results using the 2×2 colour binning method illustrated in FIG. 6. It is clearly seen that the quality of the bottom images are superior to the quality of the uppermost images. The clearly jagged edges of the uppermost images in FIG. 13 are the result of an uneven distribution of the optical centres. Using colour binning methods according to the other embodiments of colour binning according to this invention result in image improvements similar to those illustrated in FIG. 13.

Figure 12:
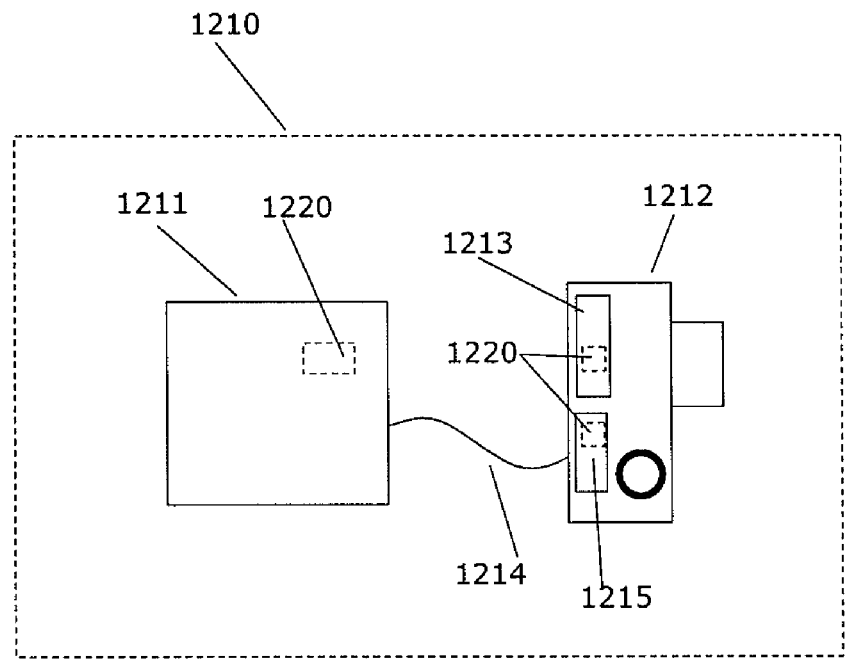
FIG. 12 shows a system 1210 adapted for performing colour binning.

FIG. 12 shows a system 1210 adapted for performing colour binning according to any embodiment of the invention. FIG. 12 shows a still-picture camera or video camera 1212 comprising a photoelectric image sensor 100, 1213 and possibly also other image processing circuits 1215. The camera 1212 may be connected via a connection 1014 to external processing devices 1211, for example a computer or other image processing devices for further processing of pixel data.

All steps of the method of colour binning may be implemented for example in the image sensor 100, 1213, other processing circuits 1215, or the colour binning method may be distributed over both the image sensor and other processing circuits so that the image sensor processes part of the colour binning method and the other processing circuits processes other parts of the colour binning method.

Similarly, the colour binning method may be distributed over both the processing circuits 1213, 1215 of the camera 1212 and the external processing devices 1211. For example part of the colour binning method is processed by one or more of the processing circuits 1213, 1215 and another part of the colour binning method is processed by external processing devices 1211.

Furthermore, the complete method of colour binning may be implemented exclusively in a single external processing device 1211 or distributed over a group of external processing devices 1211, for example as a computer program product. The image pixel data may be provided to the external processing device 1211 via a connection 1214 from a camera or an image scanner. Alternatively, the image pixel data may provided to the external processing device 1211 via a storage medium, eg. a DVD, or the image pixel data may be provided to the external processing device 1211 via a data connection, eg. an internet connection.

Accordingly, the image sensor 100, 1213, the processing circuits 1215 and/or the external processing device 1211 may comprise selection means 1220 for selecting first, second, third and fourth pixels (R, G, g, B) and for and using values of the selected pixels for generating values of a respective first, second, third and fourth macro pixels. Alternatively, the image sensor 100, 1213, the other processing circuits 1215 and/or the external processing device 1211 may comprise separate selection means for selecting pixels (not illustrated) and separate generating means (not illustrated) for using values of the selected pixels for generating values of the respective macro pixels.

The selection means 1220 may be software-implemented selection means or a hardware-implemented selection means that are implemented or integrated for example in the image sensor. The selection means 1220 may also be implemented as a combination of software and hardware implementations. The method of colour binning may be implemented in a single selection means 1220 comprised eg by the image sensor 1213, or the method of colour binning may distributed over more selection means 1220 comprised by one or more of an image sensor 1213, a processing circuit 1215 and an external processing device 1211. Similarly, the separate selection means and generating means may be implemented in hardware or software.

In an example of 2×2 colour binning, the colour binning procedure could for example be distributed over the image sensor 1213 and an external processing device 1211 so that values of two red pixels R1, R2 are added in the image sensor 1213 whereas values of the two remaining red pixels R3, R4 are added in a subsequent step in an external processing device 1211. The procedure can be repeated for the pixels of all, or some, of the other colours. In another example of 2×2 colour binning, for example red and blue pixels are binned in the image sensor 1213, whereas the green pixels are binned in an external processing device 1211. It may be advantageous to perform colour binning in the image sensor 1213 for obtaining a high speed of pixel readout or for obtaining a higher signal to noise ratio.

Thus, it should be understood that generating a value of a macro pixel (RR,GG, gg, BB) means that values of any number of pixels may be processed, eg added, by selection means 1220 in the electronic chip device 1213 also referred to as the image sensor 1213. For example the value of one pixel (R1 or B1) out of n×n selected pixels (R1-R4 or B1-B4) may be processed in the chip, and the remaining n×n−1 or M−1 pixels (R2-R4 or B2-B4) may be processed by an external processing device 1211. In another example the values of two out of n×n selected pixels (R1-R4) may be processed by selection means 1220 in the chip, and the remaining n×n−2 or M−2 pixels may be processed by selection means 1220 in external processing devices 1211 or other image processing circuits 1215. In a general example the Q values of Q pixels out of n×n selected pixels may be processed in the electronic chip device 1213 or the processing device 1215 and the remaining n×n−Q or M-Q pixels may be processed by one or more external processing devices 1211 or other processing circuits 1215. The processing of values in the chip or the external processing devices may comprise adding values, averaging values or and other mathematical processing of values.

In another example of distributing the colour binning procedure, the electronic chip device 1213, for example a CCD chip, may be designed so that for example the selection of first pixels R1-R4 and the generation of a value of a first macro pixel RR is carried out by the selection means 1220 in electronic chip device 1213, whereas the selection of second G1-G4, third g1-g4 and fourth pixels B1-B4 and generation of values of second GG, third gg and fourth BB macro pixels is carried out by selection means 1220 in an external processing device 1211 or an other image processing device 1215. In another example the selection of second pixels G1-G4 and third pixels g1-g4 as well as the generation of a value of a second macro pixel GG and the value of a third macro pixel gg is carried out by the selection means 1220 in electronic chip device 1213, whereas the selection of first pixels R1-R4 and fourth pixels B1-B4 as well as generation of values of a first macro pixel RR and a fourth macro pixel BB is carried out by selection means 1220 in an external processing device 1211 or an other image processing device 1215.

Any of the above-mentioned examples of distributing the steps of the method of colour binning may be combined with each other and distributed over various processing devices. Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method, performed on at least one of an image sensor, a processing circuit, an external processing device, a processing device, or a computer processor, including any combination thereof, for reducing a resolution of a digital colour image (100) where the digital colour image comprises pixels (101) arranged in a colour mask (102) of at least three different colours, the pixels comprise first pixels (R), second pixels (G), third pixels (g) and fourth pixels (B), the method comprising:

recording a digital colour image using the colour mask (102), selecting n×n first pixels (R) outlining a first square (SR), and using values of these selected n×n pixels for generating a value of a first macro pixel (202, RR), selecting n×n second pixels (G) outlining a second square (SG) being rotated 45 degrees and shifted horizontally relative to the first square (SR), and using values of these selected n×n pixels for generating a value of a second macro pixel (202, GG), selecting n×n third pixels (g) outlining a third square (Sg) being rotated 45 degrees and shifted vertically relative to the first square (SR), and using values of the n×n pixels for generating a value of a third macro pixel (202, gg), where each of the first, second and third macro pixels has an optical centre (201, CR, CG, Cg) determined by the relative positions of the pixels used to generate the value of the macro pixel (202), wherein the pixels used to generate values of the first, second and third macro pixels are selected to position the optical centres (201) of each of the first, second and third macro pixels (202) at identical positions within each of the first, second and third macro pixels, so that these optical centres form a uniform grid (WG), and selecting M pixels from n×n fourth pixels (B) outlining a fourth square (SB) oriented identically to and shifted diagonally relative to the first square (SR), M being greater than zero and less than or equal to n×n, and using values of the M pixels for generating a value of a fourth macro pixel (202, BB), where n is an integer value greater than one.

2. A method according to claim 1, wherein the selected M pixels and the resulting optical centre (CB, 201) is displaced a distance (D) relative to the uniform grid (WG), where the distance (D) depends on both M and positions of the M pixels relative to the fourth square (SB) in a way so that:

for n×n being an uneven integer: M=n×n results in D=0, and for n×n being an even integer: M=n×n results in D>0 and M<n×n results in D=0 for some values of M.

3. A method according to claim 2, wherein the distance (D) depends on both M and positions of the M pixels relative to the fourth square (SB) in a way so that:

for n×n=4: M=1 results in D=0 and M>1 results in D>0.

4. A method according to claim 2, wherein the distance (D) depends on both M and positions of the M pixels relative to the fourth square (SB) in a way so that:

for n×n=16: M=1 and M=9 results in D=0.

5. A method according to claim 1, wherein the second square (SG) overlaps with the first square (SR), the third square (Sg) overlaps with the first square (SR) and the fourth square (SB) overlaps with one or more of the first, second and third squares.

6. A method according to claim 1 wherein n×n equals four and M equals one, the method thus comprising:

selecting one fourth pixel (B) and using a value of the one fourth pixel for generating a value of a fourth macro pixel (BB), the selected pixel and the resulting optical centre (CB) having a zero distance (D) relative to the uniform grid (WG), the three remaining fourth pixels (B) being disregarded.

7. A method according to claim 1 wherein n×n equals four and M equals four, the method thus comprising:

selecting four fourth pixels (B) and using values of the four fourth pixels to generate a value of the fourth macro pixel (BB), the selected pixels providing an optical centre (CB) having a distance (D) relative to the uniform grid (WG).

8. A method according to claim 1 wherein n×n equals four and M equals three, the method thus comprising:

selecting a one fourth pixel (B) having a zero distance (D) relative to the uniform grid (WG), selecting two fourth pixels (B) being nearest to the first selected one pixel (B) and using the three selected fourth pixels (B) to generate a value of the fourth macro pixel (BB), the selected pixels providing an optical centre (CB) having a reduced distance (D) relative to the uniform grid (WG), the one remaining fourth pixel (B) being disregarded.

9. A method, performed on at least one of an image sensor, a processing circuit, an external processing device, a processing device, or a computer processor, including any combination thereof, for reducing a resolution of a digital colour image by a factor of two in both a horizontal and a vertical direction, where the digital colour image is arranged in sets of 16 pixels, where each set comprising four first pixels (R), four second pixels (G), four third pixels (g) and four fourth pixels (B) constitutes a collection of pixels for generating values of four macro pixels comprising a first macro pixel (RR), a second macro pixel (GG), a third macro pixel (gg) and a fourth macro pixel (BB), the method comprising:
  recording a digital colour image using a colour mask;
  for each set of 16 pixels:
    selecting four first pixels (R1, R2, R3, R4) and using values of the four pixels for generating a value of the first macro pixel (202, RR);
    selecting four second pixels (G1, G2, G3, G4) and using values of the four pixels for generating a value of the second macro pixel (202, GG);
    selecting four third pixels (g1, g2, g3, g4) and using values of the four pixels for generating a value of the third macro pixel (202, gg);
  where each of the first, second and third macro pixels has an optical centre (201) determined by the relative positions of the pixels used to generate the value of the macro pixel (202);
  wherein the pixels used to generate values of the first, second and third macro pixels (202) are selected to position the optical centres (201) of each of the first, second and third macro pixels at identical positions within each of the first, second and third macro pixels, so that these optical centres form a uniform grid (WG), and generating a value of a fourth macro pixel (BB) using any one of:
  selecting one fourth pixel (B1) and using a value of the one fourth pixel for generating a value of the fourth macro pixel (BB), the selected pixel providing an optical centre (CB) having a zero distance (D) relative to the uniform grid (WG), the three remaining fourth pixels (B2-B4) being disregarded;
  selecting four fourth pixels (B1-B4) and using values of the four fourth pixels to generate a value of the fourth macro pixel (BB), the selected pixels providing an optical centre (CB) having a distance (D) relative to the uniform grid (WG); or
  selecting a first fourth pixel (B4) having zero distance (D) relative to the uniform grid (WG), selecting two fourth pixels (B2, B3) being nearest to the selected first pixel (B4) and using the three selected pixels to generate a value of the fourth macro pixel (BB), the selected pixels providing an optical centre (CB) having a reduced distance (D) relative to the uniform grid (WG), the one remaining pixel (B1) of the fourth pixel-type being disregarded.

10. A method according to claim 1 or 9, wherein the colour mask is Bayer mask comprising one red pixel (R), two green pixels (g, G) and one blue pixel (B).

11. A method according to claim 1 or 9, wherein the first pixel is a red pixel (R), the second pixel is a green pixel (g), the third pixel is green pixel (G) and the fourth pixel is a blue pixel (B).

12. A method according to claim 1 or 9, wherein the values of the selected pixels of respective first, second, third and fourth pixels (R, G, g, B) are added for generating a value of the respective first, second, third and fourth macro pixel (RR, GG, gg, BB).

13. A method according to claim 1 or 9, wherein the values of the selected pixels of respective first, second, third and fourth pixels (R, G, g, B) are averaged for generating a value of the respective first, second, third and fourth macro pixel (RR, GG, gg, BB).

14. A system (1210), implemented on one or more of an image sensor (1213), a processing circuit (1215) and an external processing device (1211), configured for reducing a resolution of a digital colour image (100) comprising pixels (101) arranged in a colour mask (102) of at least three different colours, the pixels comprise first pixels (R), second pixels (G), third pixels (g) and fourth pixels (B), the system comprises selection means (1220) for,
  selecting n×n first pixels (R) outlining a first square (SR), and using values of these selected n×n pixels for generating a value of a first macro pixel (202, RR),
  selecting n×n second pixels (G) outlining a second square (SG) being rotated 45 degrees and shifted horizontally relative to the first square (SR), and using values of these selected n×n pixels for generating a value of a second macro pixel (202, GG),
  selecting n×n third pixels (g) outlining a third square (Sg) being rotated 45 degrees and shifted vertically relative to the first square (SR), and using values of the n×n pixels for generating a value of a third macro pixel (202, gg),
  where each of the first, second and third macro pixels has an optical centre (201, CR, CG, Cg) determined by the relative positions of the pixels used to generate the value of the macro pixel (202),
  wherein the pixels used to generate values of the first, second and third macro pixels are selected to position the optical centres (201) of each of the first, second and third macro pixels (202) at identical positions within each of the first, second and third macro pixels, so that these optical centres form a uniform grid (WG), and said system (1210) further comprising selection means (1220) for,
  selecting M pixels from n×n fourth pixels (B) outlining a fourth square (SB) oriented identically to and shifted diagonally relative to the first square (SR), M being greater than zero and less than or equal to n×n, and using values of the M pixels for generating a value of a fourth macro pixel (BB), where n is an integer value greater than one.

15. A computer program product stored on a non-transitory computer-readable medium, the product capable of reducing a resolution of a digital colour image (100) being recorded using a colour mask (102), where the digital colour image (100) comprises pixels (101) arranged in the colour mask of at least three different colours, the pixels comprise first pixels (R), second pixels (G), third pixels (g) and fourth pixels (B), said computer program product being configured to perform the method according to claim 1 or claim 9.

16. A camera (1212) or system (1210) comprising an electronic chip device (1213, 1215) configured for reducing a resolution of a digital colour image (100) comprising pixels (101) arranged in a colour mask of at least three different colours, the pixels comprise first pixels (R), second pixels (G), third pixels (g) and fourth pixels (B), the electronic chip device comprises selection means (1220) configured for selecting pixels outlining at least one of a first square (SR), a second square (SG), a third square (Sg), or a fourth square (SB) and generating at least one of a first, second, third, or fourth macro pixel by carrying out at least one of steps a, b, c or d,
  a) selecting n×n first pixels (R) outlining the first square (SR), and using values of these selected n×n pixels for generating a value of the first macro pixel (202, RR), b) selecting n×n second pixels (G) outlining the second square (SG) and using values of these selected n×n pixels for generating a value of the second macro pixel (202, GG),
c) selecting n×n third pixels (g) outlining the third square (Sg) and using values of the n×n pixels for generating a value of the third macro pixel (202, gg),
d) selecting M pixels from n×n fourth pixels (B) outlining the fourth square (SB), M being greater than zero and less than or equal to n×n, and using values of the M pixels for generating a value of the fourth macro pixel (202, BB), where n is an integer value greater than one, where the second square (SG) is in a position rotated 45 degrees and shifted horizontally relative to the first square (SR), the third square (Sg) is in a position rotated 45 degrees and shifted vertically relative to the first square (SR), and the fourth square (SB) is in a position oriented identically to and shifted diagonally relative to the first square (SR), where each of the first, second and third macro pixels has an optical centre (201, CR, CG, Cg) determined by the relative positions of the pixels used to generate the value of the macro pixel (202), and wherein the pixels used to generate values of the first, second and third macro pixels are selected to position the optical centres (201) of each of the first, second and third macro pixels (202) at identical positions within each of the first, second and third macro pixels, so that these optical centres form a uniform grid (WG), where the camera (1212) or system (1210) is configured to provide any remaining step(s) of steps a, b, c or d not carried out by the electronic chip device (1213, 1215).

17. The electronic chip device (1213, 1215) according to claim 16, the electronic chip device being configured to provide output image data comprising values of macro pixels corresponding to any of steps a, b, c and d carried out by the electronic chip device (1213, 1215), and values of any first, second, third and/or fourth pixels corresponding to any of steps a, b, c and d not carried out by the electronic chip device, wherein the output image data is formatted so that a camera (1212), a system (1210) or an external processing device (1211) configured for reducing a resolution of a digital colour image can readily distinguish between values of macro pixels and any values of first, second, third and/or fourth pixels in the output image data.

18. The electronic chip device (1213, 1215) according to claim 17, wherein the output image data is formatted in accordance with a predetermined format for exchange of data between the electronic chip device (1213, 1215) and anyone of a camera (1212), a system (1210) or an external processing device (1211).

\* \* \* \* \*